United States Patent
Lee et al.

(10) Patent No.: US 9,844,008 B2
(45) Date of Patent: Dec. 12, 2017

(54) METHOD FOR TRANSMITTING POWER HEADROOM REPORT IN NETWORK SUPPORTING INTERWORKINGS BETWEEN MULTIPLE COMMUNICATION SYSTEMS, AND APPARATUS THEREFOR

(71) Applicant: LG ELECTRONICS INC., Seoul (KR)

(72) Inventors: Eunjong Lee, Seoul (KR); Hyunsoo Ko, Seoul (KR); Dongcheol Kim, Seoul (KR); Hyeyoung Choi, Seoul (KR); Genebeck Hahn, Seoul (KR); Heejeong Cho, Seoul (KR); Jaehoon Chung, Seoul (KR)

(73) Assignee: LG ELECTRONICS, Seoul (KR)

( * ) Notice: Subject to any disclaimer, the term of this patent is extended or adjusted under 35 U.S.C. 154(b) by 80 days.

(21) Appl. No.: 14/893,001

(22) PCT Filed: May 23, 2014

(86) PCT No.: PCT/KR2014/004622
§ 371 (c)(1),
(2) Date: Nov. 20, 2015

(87) PCT Pub. No.: WO2014/189321
PCT Pub. Date: Nov. 27, 2014

(65) Prior Publication Data
US 2016/0119883 A1    Apr. 28, 2016

Related U.S. Application Data

(60) Provisional application No. 61/826,523, filed on May 23, 2013, provisional application No. 61/843,040, filed on Jul. 4, 2013.

(51) Int. Cl.
*H04W 52/36*    (2009.01)
*H04W 52/14*    (2009.01)
(Continued)

(52) U.S. Cl.
CPC ....... *H04W 52/365* (2013.01); *H04W 52/146* (2013.01); *H04W 52/367* (2013.01); *H04W 84/12* (2013.01); *H04W 88/06* (2013.01)

(58) Field of Classification Search
CPC ............. H04W 52/146; H04W 52/367; H04W 52/365; H04W 88/06; H04W 84/12
See application file for complete search history.

(56) References Cited

U.S. PATENT DOCUMENTS

2011/0310760 A1* 12/2011 Wu ................... H04W 72/0413
                                                         370/252
2012/0040707 A1*  2/2012 Kim ..................... H04W 52/365
                                                         455/522

(Continued)

FOREIGN PATENT DOCUMENTS

EP    2509373    10/2012
EP    2696633    2/2014

(Continued)

OTHER PUBLICATIONS

European Patent Office Application Serial No. 14800404.7, Search Report dated Nov. 24, 2016, 8 pages.

(Continued)

*Primary Examiner* — Brian D Nguyen
(74) *Attorney, Agent, or Firm* — Lee Hong Degerman Kang Waimey

(57) ABSTRACT

A method for a terminal in a first communication system to transmit a power headroom report in a network supporting interworking of a plurality of communication systems comprises a step for transmitting a power headroom report comprising a power headroom value related to a second communication system, when a predetermined triggering condition occurs in a state in which the terminal is accessing the first and second communication systems simultaneously, (Continued)

wherein the power headroom report can comprise information regarding maximum transmission power for the second communication system.

15 Claims, 10 Drawing Sheets

(51) Int. Cl.
*H04W 88/06* (2009.01)
*H04W 84/12* (2009.01)

(56) References Cited

U.S. PATENT DOCUMENTS

| | | | | |
|---|---|---|---|---|
| 2012/0106477 | A1* | 5/2012 | Kwon | H04W 52/365 370/329 |
| 2012/0176923 | A1* | 7/2012 | Hsu | H04W 52/243 370/252 |
| 2012/0224552 | A1* | 9/2012 | Feuersanger | H04L 5/0007 370/329 |
| 2013/0028223 | A1* | 1/2013 | Kim | H04L 5/0007 370/329 |
| 2013/0065525 | A1 | 3/2013 | Kiukkonen et al. | |
| 2013/0089062 | A1* | 4/2013 | Ahn | H04W 52/365 370/329 |

FOREIGN PATENT DOCUMENTS

| | | |
|---|---|---|
| KR | 10-2012-0016987 | 2/2012 |
| KR | 10-2013-0038370 | 4/2013 |
| WO | 2012/064872 | 5/2012 |
| WO | 2012136104 | 10/2012 |

OTHER PUBLICATIONS

PCT International Application No. PCT/KR2014/004622, Written Opinion of the International Searching Authority dated Sep. 4, 2014, 21 pages.

\* cited by examiner

Oct 1

METHOD FOR TRANSMITTING POWER HEADROOM REPORT IN NETWORK SUPPORTING INTERWORKINGS BETWEEN MULTIPLE COMMUNICATION SYSTEMS, AND APPARATUS THEREFOR

CROSS-REFERENCE TO RELATED APPLICATIONS

This application is the National Stage filing under 35 U.S.C. 371 of International Application No. PCT/KR2014/004622, filed on May 23, 2014, which claims the benefit of U.S. Provisional Application No. 61/826,523, filed on May 23, 2013, and 61/843,040, filed Jul. 4, 2013, the contents of which are all hereby incorporated by reference herein in their entirety.

TECHNICAL FIELD

The present invention relates to wireless communication, and more particularly, to a method of transmitting a power headroom report in a network supporting interworking between a plurality of communication systems and an apparatus therefor.

BACKGROUND ART

There is a multi-RAT user equipment (UE) having capability in which the multi-RAT UE can access two or more radio access technologies (RATs). In order to access a specific RAT, connection to a specific RAT can be established on the basis of a UE request, and data transmission/reception can be achieved on the basis of the UE request.

However, although the multi-RAT UE has the capability to access two or more RATs, the multi-RAT UE cannot simultaneously access multiple RATs. In other words, although a current UE has multi-RAT capability, the UE cannot simultaneously transmit and receive data through different RATs.

Since the aforementioned legacy multi-RAT technology does not require interworking between a wireless LAN and a cellular network, overall system efficiency is low. And, power transmittable to a UE is fixed. Yet, when a multi-RAT UE transmits data via a plurality of communication systems at the same time, it is necessary to control power. Hence, it is necessary for the multi-RAT UE to report a power headroom report to a network to control power in a situation that a plurality of the communication systems are interworking.

However, a method for a multi-RAT UE to report a power headroom report in a situation that a plurality of the communication systems are interworking has not been specifically proposed yet.

DISCLOSURE OF THE INVENTION

Technical Tasks

One technical task of the present invention is to provide a method of transmitting a power headroom report in a network supporting interworking between a plurality of communication systems.

Another technical task of the present invention is to provide a terminal of a first communication system transmitting a power headroom report in a network supporting interworking between a plurality of communication systems.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a power headroom report by a user equipment of a first communication system in a network supporting interworking between a plurality of communication systems, includes the step of, when a prescribed triggering condition occurs in a state that the user equipment accesses to the first communication system and a second communication system at the same time, transmitting a power headroom report including a power headroom related to the second communication system. In this case, the power headroom report can include information on a maximum transmit power of the second communication system. The prescribed triggering condition can include a case that power functionality is reconfigured according to whether or not the user equipment is activated with the second communication system or a case that there exist a data to be transmitted via the second communication system during a corresponding transmission time interval (TTI). The power headroom report can further include information on a configured maximum transmit power in the first communication system and a power headroom value based on actual transmit power strength to the second communication system during corresponding time. The maximum transmit power of the second communication system may correspond to transmit power determined by the user equipment or local maximum transmit power transmitted from a base station of the second communication system. The maximum transmit power of the first communication system is configured to be smaller than a maximum transmit power, which is configured when the user equipment communicates with the first communication system only. The power headroom report is identified by a logical channel identifier including a specific value.

To further achieve these and other advantages and in accordance with the purpose of the present invention, according to a different embodiment, a user equipment of a first communication system for transmitting a power headroom report in a network supporting interworking between a plurality of communication systems includes a transmitter and a processor, wherein the processor, when a prescribed triggering condition occurs in a state that the user equipment accesses to the first communication system and a second communication system at the same time, configured to control the transmitter to transmit a power headroom report including a power headroom related to the second communication system. In this case, the power headroom report may include information on maximum transmit power of the second communication system. The prescribed triggering condition may include a case that a power functionality is reconfigured according to whether or not the user equipment is activated with the second communication system. The prescribed triggering condition may include a case that there exist a data to be transmitted via the second communication system during a corresponding transmission time interval (TTI). The power headroom report may further include information on a configured maximum transmit power in the first communication system and a power headroom value based on actual transmit power strength to the second communication system during corresponding time. A maximum transmit power of the second communication system may correspond to transmit power determined by the user equipment or local maximum transmit power transmitted from a base station of the second communication system. The maximum transmit power of the first communication system can be configured to be smaller than a maximum transmit power, which is configured when the user equipment communicates with the first communication system only. The power headroom report can be identified by a logical channel identifier including a specific value. The first communication system corresponds to a cellular system and the second communication system corresponds to a wireless LAN communication system.

Advantageous Effects

In case of a UE, which has accessed a cellular network and a WiFi network at the same time, the UE is able to efficiently control transmit power of a UE capable of simultaneously transmitting data to the cellular network and the WiFi network using a power headroom report on wireless LAN-related transmit power proposed by the present invention in a wideband wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
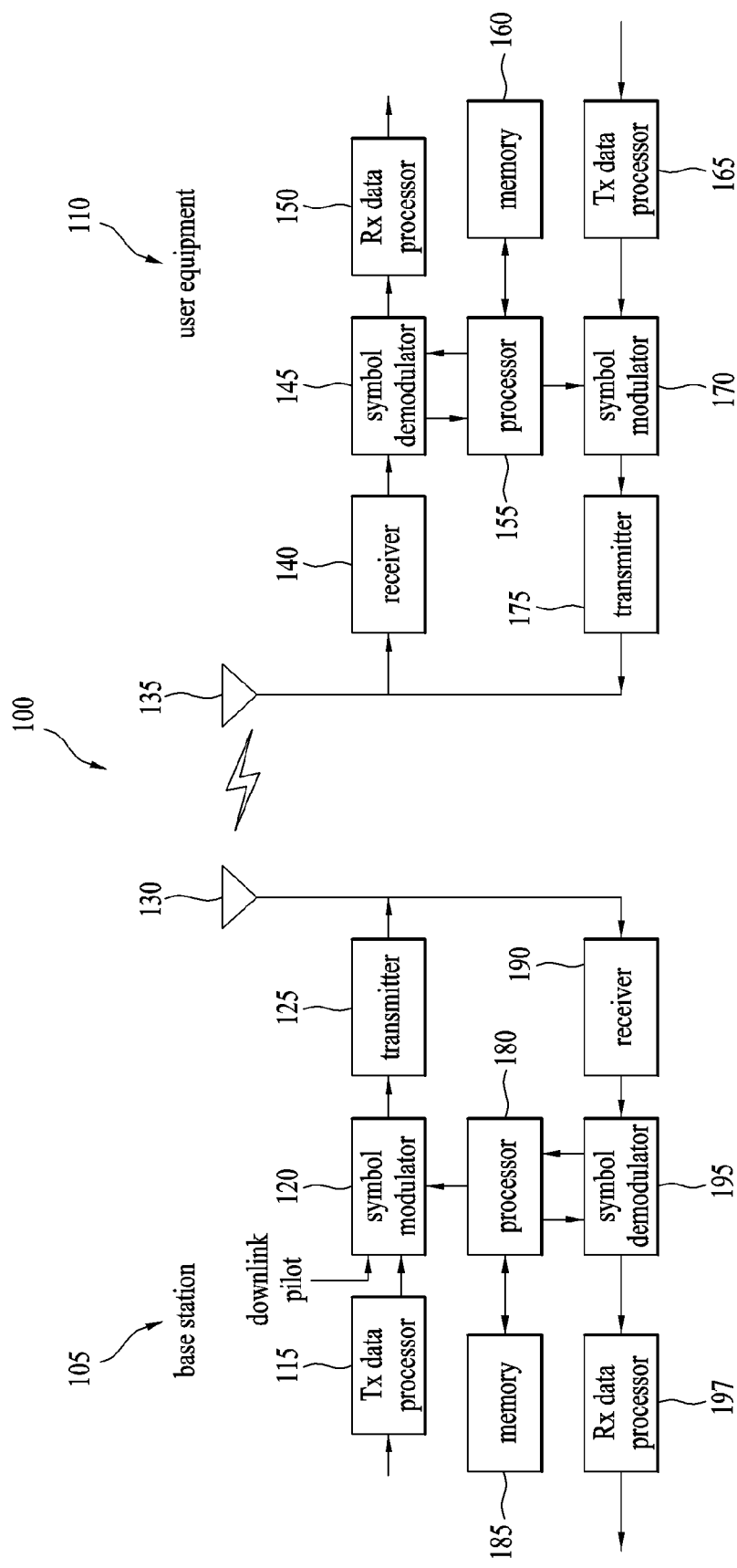
FIG. 1 is a block diagram for a configuration of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Information element formats used in IEEE 802.11 system are shown in Table 1 in the following.

TABLE 1

| Management frame body components |
| --- |
| 1. Fields that are not information elements<br>Max Transmit Power field |
| The Max Transmit Power field is a twos complement signed integer and is 1 octet in length, providing an upper limit, in units of dBm, on the transmit power as measured at the output of the antenna connector to be used by that AP on the current channel.<br>Operation of the Max Transmit Power field<br>The maximum tolerance for the value reported in Max Transmit Power field shall be 5 dB.<br>The value of the Max Transmit Power field shall be less than or equal to the Max Regulatory Power value for the current channel.<br>Transmit Power Used field |
| The Transmit Power Used field is twos complement signed integer and is 1 octet in length. It is less than or equal to the Max Transmit Power and indicates the actual power used as measured at the output of the antenna connector, in units of dBm, by a STA when transmitting the frame containing the Transmit Power Used field. The Transmit Power Used value is determined anytime prior to sending the frame in which it is contained and has a tolerance of ±5 dB. |

A power constraint element of IEEE 802.11 system is shown in Table 2 in the following.

TABLE 2

| |
| --- |
| The Power Constraint element contains the information necessary to allow a STA to determine the local maximum transmit power in the current channel. The field is coded as an unsigned integer in units of decibels. The local maximum transmit power for a channel is thus defined as the maximum transmit power level specified for the channel in the Country element minus the local power constraint specified for the channel (from the MIB) in the Power Constraint element.<br>The Power Constraint element is included in Beacon frames and Probe Response frames.<br>Specification of regulatory and local maximum transmit power levels<br>A lower local maximum transmit power level may be used for other purposes (e.g., range control, reduction of interference).<br>An AP in a BSS, a STA in an IBSS, and a mesh STA in an MBSS shall advertise the regulatory maximum transmit power for that STA's operating channel in Beacon frames and Probe Response frames using a Country element. An AP in a BSS, a STA in an IBSS, and a mesh STA in an MBSS shall advertise the local maximum transmit power for that STA's operating channel in Beacon frames and Probe Response frames using the combination of a Country element and a Power Constraint element.<br>Selection of a transmit power |
| A STA may select any transmit power for transmissions in a channel within the following constraints:<br>A STA shall determine a regulatory maximum transmit power and a local maximum transmit power for a channel in the current regulatory domain before transmitting in the channel. An AP shall use a transmit power less than or equal to the regulatory maximum transmit power level for the channel. The AP shall also meet any regulatory mitigation requirement. A STA that is not an AP shall use a transmit power less than or equal to the local maximum transmit power level for the channel.<br>In the following, TPC(Transmit Power Control) procedures are briefly explained<br>Regulations that apply to the 5 GHz band in most regulatory domains require RLANs operating in the 5 GHz band to use transmitter power control, involving specification of a regulatory maximum transmit power and a mitigation requirement for each allowed channel, to reduce interference with satellite services. This standard describes such a mechanism, referred to as transmit power control (TPC). This subclause describes TPC procedures that may satisfy needs in many regulatory domains and other frequency bands and may be useful for other purposes (e.g., reduction of interference, range control, reduction of power consumption). |

TABLE 2-continued

The TPC procedures provide for the following:

Association of STAs with an AP in a BSS based on the STAs' power capability.
Specification of regulatory and local maximum transmit power levels for the current
channel. Selection of a transmit power for each transmission in a channel within
constraints imposed by regulatory and local requirements.
Adaptation of transmit power based on a range of information, including path loss and
link margin estimates.

Adaptation of the transmit power is briefly explained in Table 3 in the following.

TABLE 3

A STA may use any criteria, and in particular any path loss and link margin estimates, to
dynamically adapt the transmit power for transmissions of an MPDU to another STA. The
adaptation methods or criteria are beyond the scope of this standard. A STA may use a
TPC Request frame to request another STA to respond with a TPC Report frame
containing link margin and transmit power information. A STA receiving a TPC Request
frame shall respond with a TPC Report frame containing the power used to transmit the
response in the Transmit Power field and the estimated link margin in a Link Margin
field. An AP in a BSS or a STA in an IBSS shall autonomously include a TPC Report
element with the Link Margin field set to 0 and containing transmit power information in
the Transmit Power field in any Beacon frame or Probe Response frame it transmits.
The Link Margin field contains the link margin for the receive time and for the receive
rate of the frame containing the TPC Request element or the Link Measurement Request
frame. The field is coded as a twos complement signed integer in units of decibels. The
Link Margin field is reserved when a TPC Report element is included in a Beacon frame
or Probe Response frame. The measurement method of Link Margin is beyond the scope
of this standard.

In the following, determining transmit power of an AP used in IEEE 802.11 system (WiFi system) is briefly explained. The transmit power of the AP is determined by transmit power capability of STAs connected under the AP and regulatory transmit power of the AP.

1. First of all, an STA transmits max/min power capability of the STA to an AP during association. 2. Subsequently, the AP calculates a local power constraint based on the received max/min power capability of the STAs. 3. The AP transmits parameters described in the following via a beacon signal, a probe response message or the like.

Local Maximum Transmit Power (=Max Transmit Power−Local Power Constraint)

Max Transmit Power≤Max Regulatory Power value for the current channel

Local Power Constraint

Regulatory Maximum Transmit Power

STA's transmit power≤Local maximum transmit power

AP's transmit power≤Regulatory maximum transmit power

In the following, contents for an STA to determine PUSCH (physical uplink shared channel) transmit power in 3GPP LTE/LTE-A system corresponding to a cellular network system are explained with reference to equation shown in the following.

$$P_{PUSCH,c}(i) = \min \left\{ \begin{array}{c} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

In this case, c corresponds to an index of a specific cell, i corresponds to a subframe index, $P_{CMAX,C}(i)$ corresponds to maximum transmit power set to an STA in the specific cell, and $\hat{P}_{CMAX,c}(i)$ corresponds to a linear value of the $P_{CMAX,c}(i)$. $M_{PUSCH,c}(i)$ corresponds to a parameter indicating a bandwidth of PUSCH resource allocation represented by the number of valid resource blocks for a subframe of an index i of the specific cell index c. $P_{O\_PUSCH,c}(j)$ corresponds to a parameter consisted by a sum of a cell-specific nominal component $P_{O\_NOMINAL\_PUSCH,c}(j)$ provided by an upper layer of the specific cell index c and a UE-specific component $P_{O\_UE\_PUSCH,c}(j)$ provided by the upper layer. $\alpha_c(j)$ corresponds to a cell-specific parameter, $PL_c$ corresponds to a downlink pathloss estimation value calculated by an STA of the specific cell index c in dB unit, $f_c(i)$ corresponds to a value indicating a current PUSCH power control adjustment status for a subframe index i of the specific cell index c, and $\Delta_{TF,c}(i)$ corresponds to a value for a codeword of the specific cell index c. The $f_c(i)$ corresponds to a value indicating a current PUSCH power control adjustment status for a subframe index i of the specific cell index c.

Transmit power of a UE capable of simultaneously transmitting data to multi-RAT or dual-RAT can be represented as follows.

Total transmit power of dual mode UE=802.11 STA Transmit Power+LTE UE Transmit Power In this case, there exists a problem on whether UL transmit power of a multi-RAT UE is able to permit all of a sum of maximum power granted to a legacy STA or a UE. It is necessary to satisfy "Max multi-RAT UE power (power of a UE in case of simultaneously transmitting data by multi-RAT)≤802.11 STA transmit power (transmit power for transmitting data by WLAN)+LTE UE transmit power (transmit power for transmitting data by LTE network). Since maximum transmit power capable of being transmitted by a UE is limitative, in order for the UE to perform data transmission at the same time using multi-RAT, it is necessary to configure STA-Pmax (maximum transmit power of the UE capable of transmitting data using WLAN) of 802.11 and UE_Pmax (maximum transmit power of the UE capable of transmitting data using LTE network) of LTE with a value lower than a legacy value, respectively. Yet, if the STA-Pmax and the UE_Pmax are configured by the value lower than the legacy value, probability of failure in transmitting data increases for a UE located at a cell edge. Moreover, it may not guarantee Over-the-air QoS. Hence, it is necessary for the cell edge UE to have a solution for simultaneously transmitting data to WLAN/cellular. The solution is explained in detail in the following description. Before the solution is explained, power headroom reporting is briefly explained. Power headroom reporting in controlling uplink power in 3GPP LTE/LTE-A system is briefly explained with reference to FIG. 2.

Figure 2A:
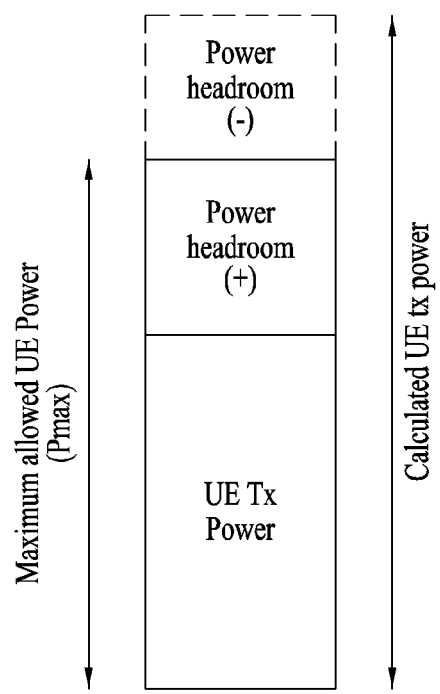
FIG. 2a is an exemplary diagram for explaining a concept of power headroom.

FIG. 2a is an exemplary diagram for explaining a concept of power headroom.

A power headroom (PH) is a value corresponding to a difference between transmit power of a UE and maximum transmit power set to the UE. If a PH value corresponds to a positive value, it indicates that the maximum transmit power set to the UE is greater than the transmit power of the UE. If a PH value corresponds to a negative value, it indicates that the transmit power of the UE exceeds the maximum transmit power set to the UE. A PH value corresponds to 1 dB resolution and belongs to a dB range ranging from −23 to 40.

Figure 2B:
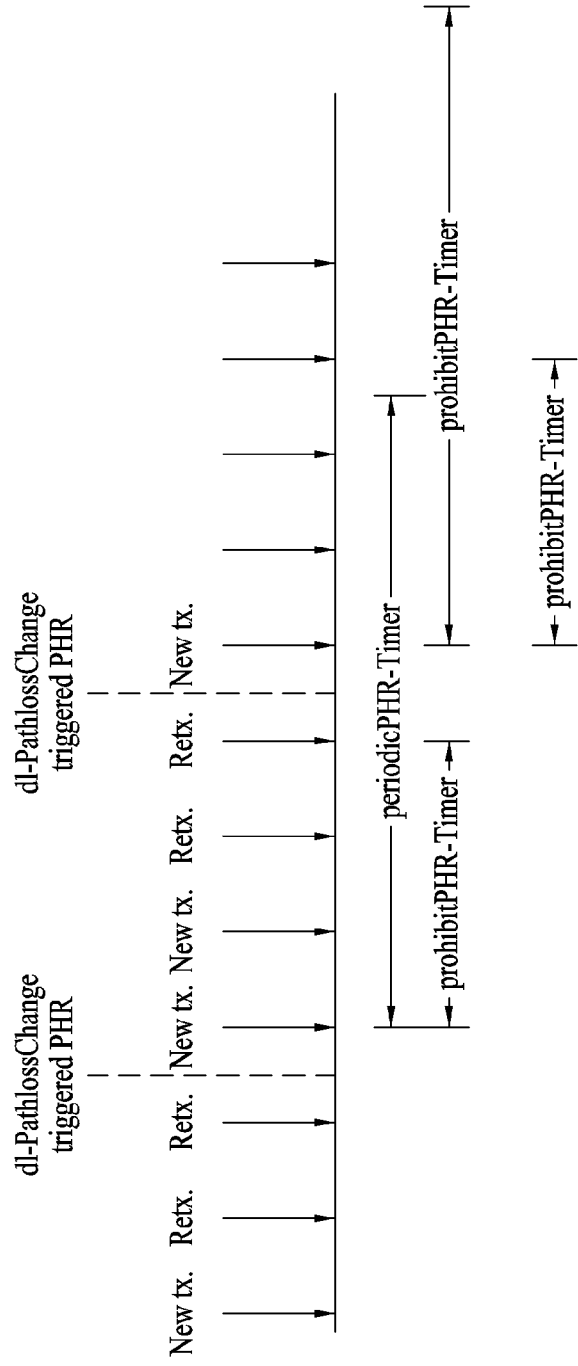
FIG. 2b is an exemplary diagram for explaining power headroom report triggering.

FIG. 2b is an exemplary diagram for explaining power headroom report triggering.

According to a current standard (3GPP TS 36.321, 36.213, etc.), a media access control element transmitted by a UE includes a BSR (buffer status report) control element and a PHR (power headroom report) control element. A power headroom report is always valid for TTIs (transmission time interval) for which uplink (UL) grant is transmitted. In general, a UE can trigger a power headroom report when events described in the following occur.

(1) When a change of a pathloss is greater than a threshold: A UE can calculate a pathloss based on a reference signal (RS) received from a network. If a change of the pathloss exceeds a prescribed threshold, the UE should transmit a power headroom report. In particular, a timer prohibitPHR-timer configured to prohibit a power headroom report is deactivated. If a change of transmission pathloss using a UE is greater than a predetermined value DL_PathlossChange, a power headroom report is triggered. The DL_PathlossChange corresponds to [1, 3, 6, inf].

(2) When a periodic report timer is expired: This situation is called a periodic power headroom report (periodic PHR). After a power headroom report is triggered, if a UE has an uplink transmission resource newly distributed by a base station in a current transmission time interval, a power headroom report control element corresponding to a power headroom value obtained from a physical layer is generated and the timer prohibitPHR-Timer is reactivated. Power headroom periodicity (periodicPHR-Timer) corresponds to [20, 200, 1000, inf] TTIs and Minimum PH reporting time (prohibitPHR-Timer) corresponds to [0, 100, 200, 1000] TTIs.

(3) When power headroom reporting functionality is configured or reconfigured by upper layers, a power headroom report is triggered.

(4) When a secondary cell is activated in configured uplink

Besides, if a periodic power edge headroom report is triggered, a periodic report timer PeriodicPHR-Timer is reactivated. For a detail operation of a power headroom report process, it may refer to relevant technical standard (3GPP TS 36.321, 36.213, etc.).

Figure 3:
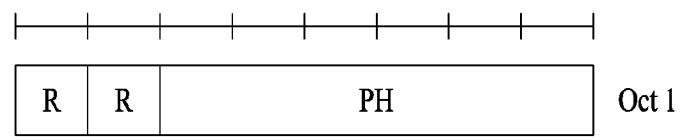
FIG. 3 is a diagram for an example of a power headroom (PH) MAC control element.

FIG. 3 is a diagram for an example of a power headroom (PH) MAC control element.

FIG. 3 shows an example of a power headroom MAC control element identified by a MAC PDU (protocol data unit) together with a logical channel identity (LCID). The power headroom MAC control element has a fixed size and can be configured by a single octet. R indicates a reserved bit. A power headroom (PH) field indicates a power headroom level. A length of the PH field may correspond to 6 bits. A reported PH and a corresponding power headroom level can be represented as two Tables (Table 4 and Table 5) shown in the following. Table 4 shows a power headroom level and Table 5 shows a PH value corresponding to the power headroom level.

TABLE 4

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

TABLE 5

| Reported value | Measured quantity value (dB) |
|---|---|
| POWER_HEADROOM_0 | $-23 \leq PH < -22$ |
| POWER_HEADROOM_1 | $-22 \leq PH < -21$ |
| POWER_HEADROOM_2 | $-21 \leq PH < -20$ |
| POWER_HEADROOM_3 | $-20 \leq PH < -19$ |
| POWER_HEADROOM_4 | $-19 \leq PH < -18$ |
| POWER_HEADROOM_5 | $-18 \leq PH < -17$ |
| ... | ... |
| POWER_HEADROOM_57 | $34 \leq PH < 35$ |
| POWER_HEADROOM_58 | $35 \leq PH < 36$ |
| POWER_HEADROOM_59 | $36 \leq PH < 37$ |
| POWER_HEADROOM_60 | $37 \leq PH < 38$ |
| POWER_HEADROOM_61 | $38 \leq PH < 39$ |
| POWER_HEADROOM_62 | $39 \leq PH < 40$ |
| POWER_HEADROOM_63 | $PH \geq 40$ |

If a plurality of serving cells are set to a UE, i.e., if CA is configured, a UE can transmit a power headroom report using an extended power headroom format.

Figure 4:
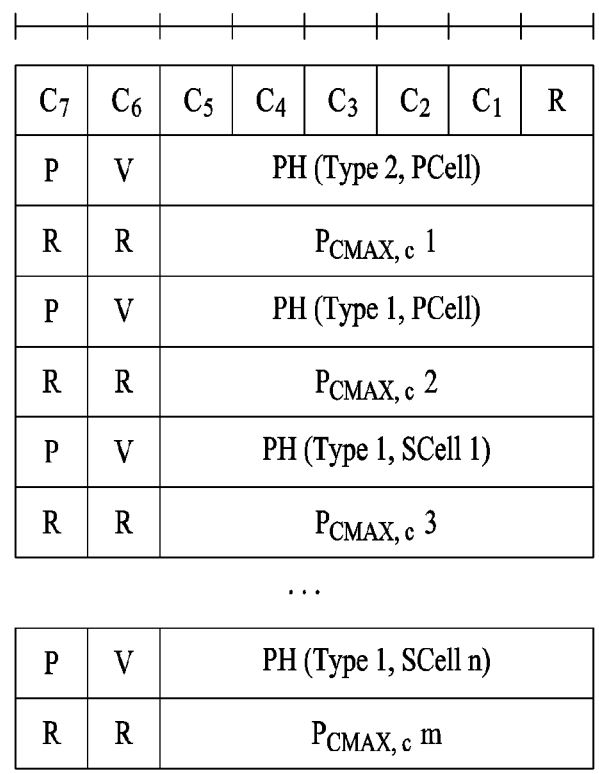
FIG. 4 is a diagram for an example of an extended power headroom format.

FIG. 4 is a diagram for an example of an extended power headroom format.

If one or more serving cells including uplink are configured, E-UTRAN (cellular network) always configures a value of an extended power headroom format. As shown in FIG. 4, the extended power headroom format can include fields indicating a PH value according to a serving cell set to a UE. A type 1 PH field and a type 2 PH field can be included in the extended power headroom format for a Pcell. And, the extended power headroom format can include a field indicating a maximum transmit power value of a UE according to a serving cell set to the UE.

In the following, a network in which a plurality of communication systems are interworking is explained.

Figure 5:
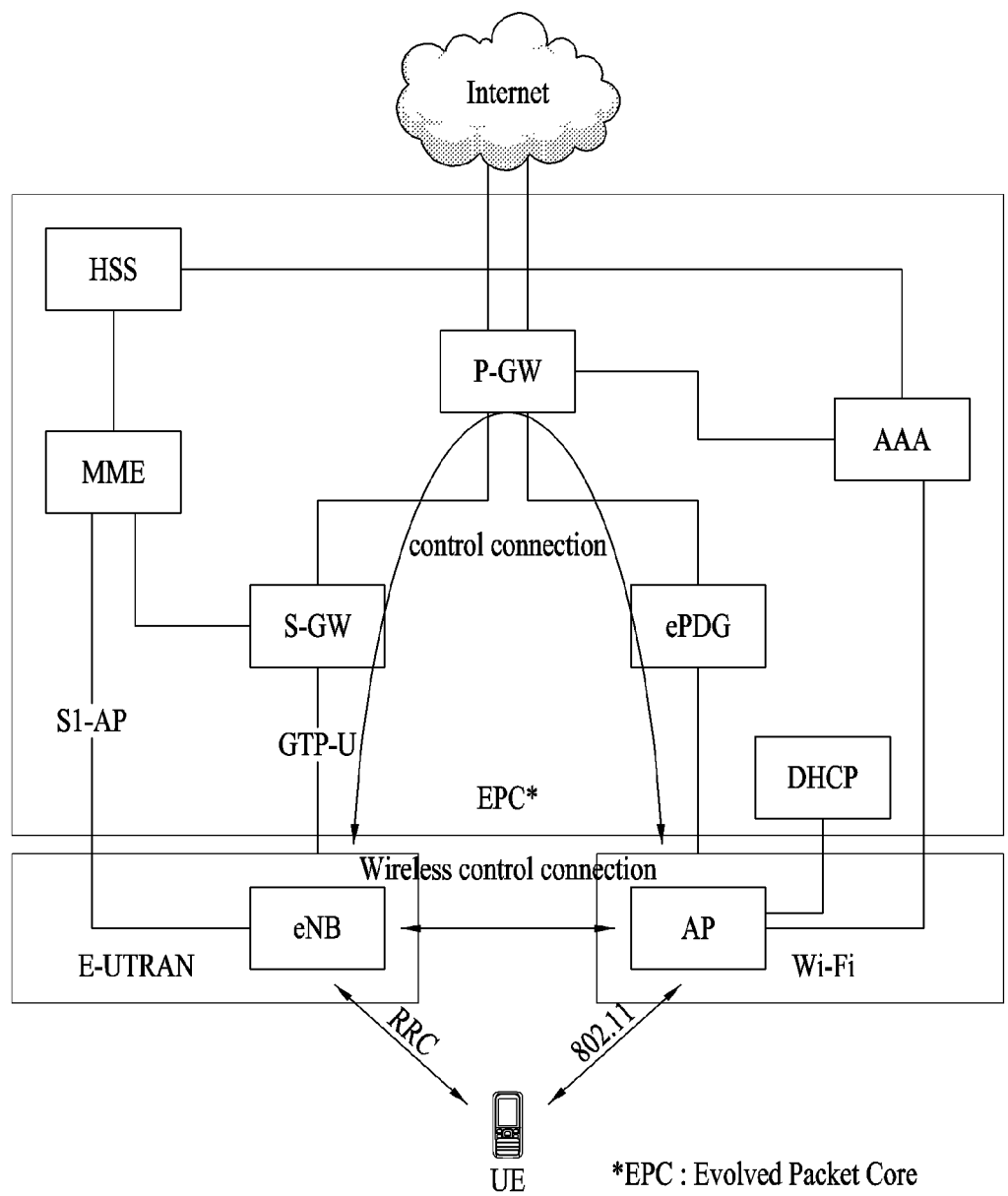
FIG. 5 is a diagram for an example of a network structure for explaining an interworking structure of a first communication system (e.g., LTE system) and a second communication system (e.g., WiFi or WLAN system)

FIG. 5 is a diagram for an example of a network structure for explaining an interworking structure of a first communication system (e.g., LTE system) and a second communication system (e.g., WiFi or WLAN system) according to the present invention.

In a network structure shown in FIG. 5, there may exist a backhaul control connection between an AP and an eNB or a wireless control connection between the AP and the eNB via a backbone network (e.g., P-GW or an EPC (evolved packet core)). For peak throughput and data traffic off-loading, a UE can support a first communication system (or a first communication network) using a first wireless communication scheme and a second communication system (or a second communication network) using a second communication scheme at the same time through interworking among a plurality of communication networks. In this case, the first communication network or the first communication system is called a primary network or a primary system, respectively. The second communication network or the second communication system can be called a secondary network or a secondary system, respectively. For example, it is able to configure a UE to support LTE (or LTE-A) and WiFi (short distance communication system such as WLAN/802.11) at the same time. The UE is called a multi system supporting UE (multi-system capability UE), a multi-RAT UE, or the like in the present specification.

In the network structure shown in FIG. 5, a primary system has a wider coverage and may correspond to a network for transmitting control information. Example of the primary system may include WiMAX or LTE (LTE-A) system. Meanwhile, a secondary system has a narrower coverage and may correspond to a network for transmitting data. The secondary network may correspond to such a wireless LAN system as WLAN and WiFi.

The present invention is explained in a manner of assuming the followings.

Assume that an entity for controlling interworking corresponds to an entity belonging to a cellular network and assume that an interworking function is implemented in three entities described in the following.

e-NB—reuse existing entity

MME (mobility management entity)—reuse existing entity

IWME (interworking management entity)—define new entity

An interworking function is associated with an interworking-related procedure capable of being occurred between an eNB and a UE or between an eNB and an AP and an entity for controlling interworking stores/manages AP information. An eNB/MME/IWME stores/manages information of APs belonging to coverage of the eNB/MME/IWME. Assume that a control connection is established between an AP corresponding to an access point of a secondary system (e.g., WiFi) and an eNB (or MME or IWME) corresponding to an access point of a primary system (e.g., LTE or WiMAX).

Method 1. wired control connection

New interface is configured via backbone network.

Method 2. wireless control connection

In the present invention, an AP including air interface with an eNB is called an eAP. In particular, the eAP should support not only 802.11 MAC/PHY but also LTE protocol stack for communicating with an eNB. The eAP plays a role of a LTE UE. This means that the eAP can communicate with an eNB.

Figure 6:
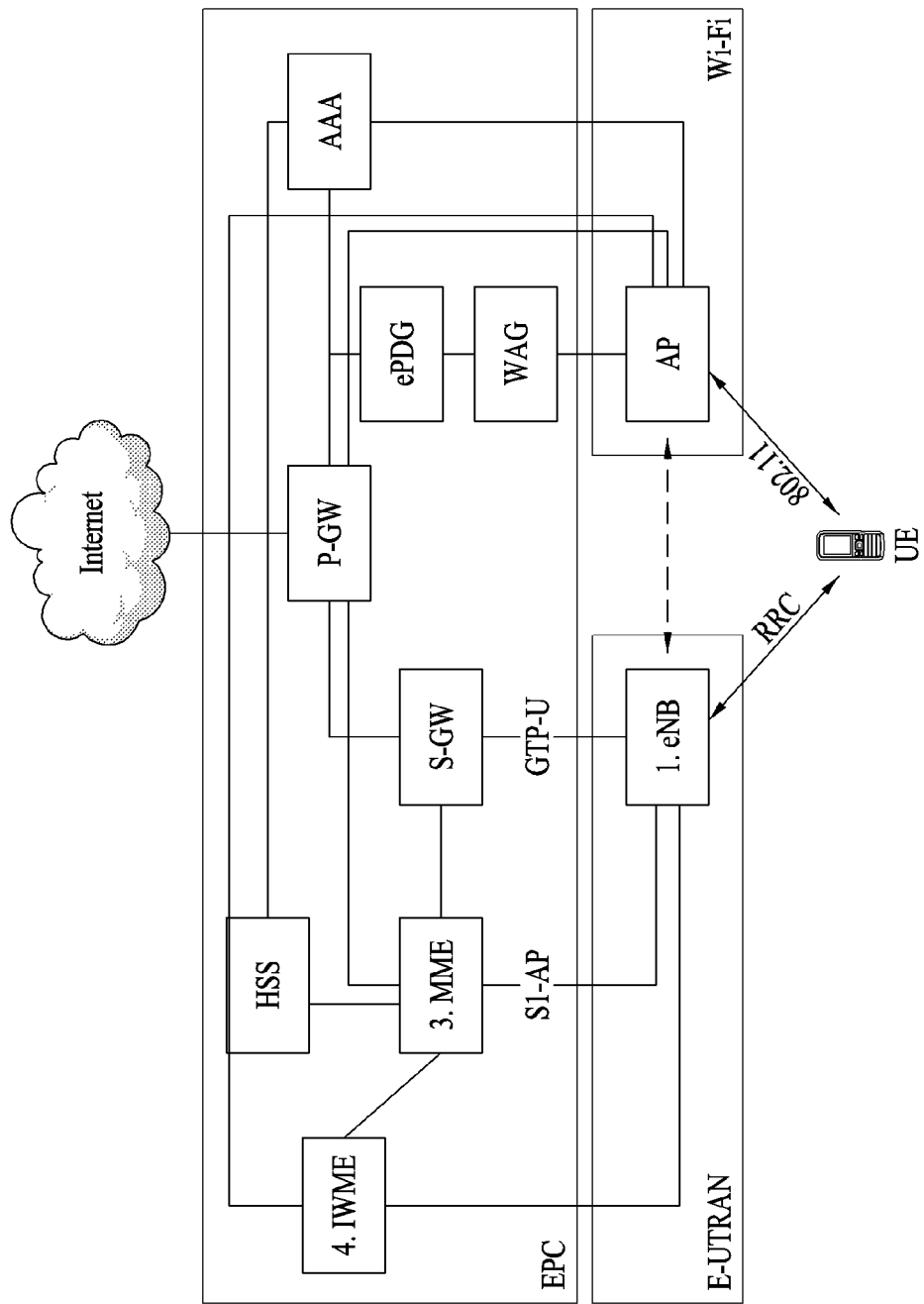
FIG. 6 is an exemplary diagram for a network structure of WiFi-cellular interworking according to the present invention.

FIG. 6 is an exemplary diagram for a network structure of WiFi-cellular interworking according to the present invention.

According to a technology of the present invention, in environment at which a user equipment capable of transmitting and receiving WiFi and a cellular network at the same time exists, in order for the dual mode UE to more efficiently use a WiFi-cellular convergence network, a cellular network can manage information of an AP according to 4 methods described in the following.

Method 1. Use air interface between an eNB and an AP

An eNB controls an AP in a manner of being similar to a method of controlling a normal UE using a wireless control connection with the AP.

Method 2. Use backhaul interface between an eNB and an AP

An eNB controls an AP using a wired control connection with the AP.

Method 3. Use control interface between an MME and an AP

An AP is controlled using a control connection between an MME and the AP (i.e., secondary system).

Method 4. Use control interface between an IWME and an AP

An AP is controlled using a control connection between an IWME and the AP (i.e., secondary system).

Figure 7:
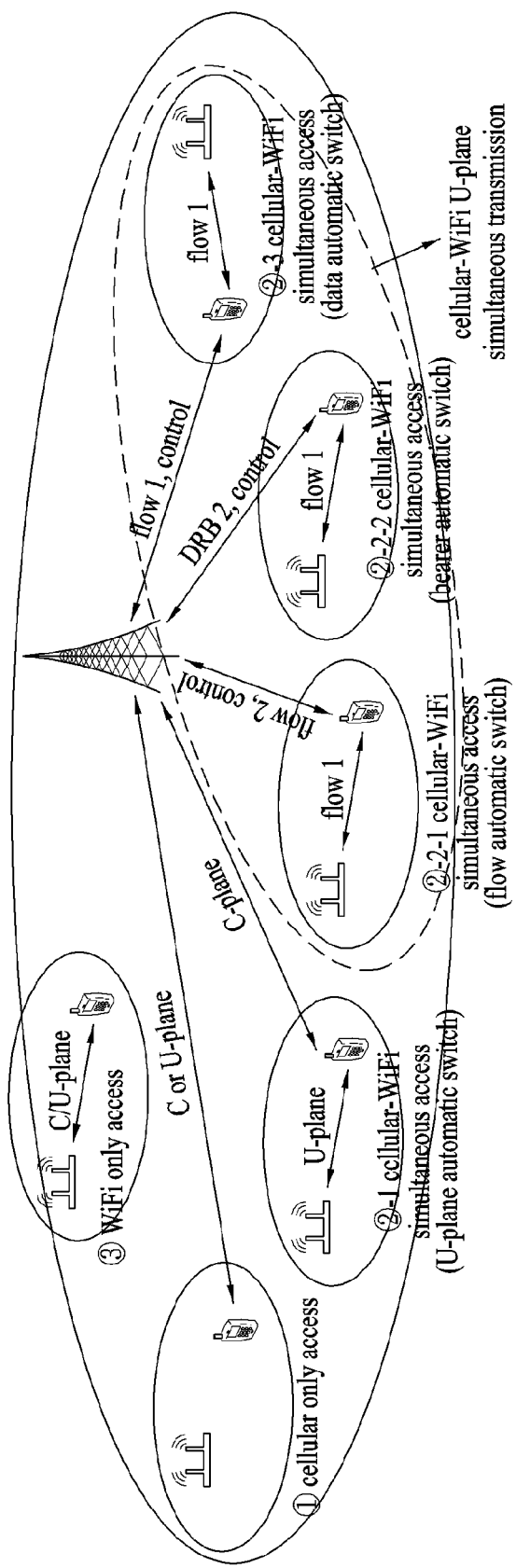
FIG. 7 is an exemplary diagram for explaining a scenario of WiFi-cellular convergence network.

FIG. 7 is an exemplary diagram for explaining a scenario of WiFi-cellular convergence network.

① scenario of FIG. 7 corresponds to a cellular-only access scenario of a UE. In order for the UE to perform WiFi auto switching/simultaneous transmission in a state that the UE accesses a cellular network only, it is necessary to define a technology in advance. AP information management for interworking is managed at a network level (cellular—WiFi) and WiFi discovery and WiFi network access are performed at a device level (cellular—device—WiFi). ②-1 scenario to ②-3 scenario show WiFi automatic switching of a user plane (U-plane), WiFi automatic switching of a flow, WiFi automatic switching of a bearer, and WiFi automatic switching of data between cellular and WiFi, respectively. If the U-plane is automatically switched between cellular and WiFi according to the ②-1 scenario, all data are transmitted via WiFi only. If the cellular-WiFi U-plane is switched to be simultaneously transmitted according to the ②-2 scenario and the ②-3 scenario, data can be transmitted at the same time via WiFi and cellular network using a bandwidth segregation or aggregation scheme. In this case, as shown in ②-2 scenario, bandwidth segregation corresponds to automatic switching according to a flow (service/IP flow). Flows different from each other are transmitted via RATs different from each other. In this case, automatic switching according to a flow may correspond to one or more service/IP flow(s). In particular, the automatic switching may correspond to switching in a flow unit (②-2-1) or switching according to a data radio (or EPS) bearer (②-2-2). As shown in ②-3 scenario, although flows are identical to each other, the bandwidth aggregation enables data to be transmitted via RATs different from each other in data unit.

After WiFi automatic switching is performed according to the ② scenario, as shown in the ③ scenario, it is able to perform WiFi-based cellular link control. Cellular link-related paging or control on a radio link failure (RLF) can be received via a WiFi link.

Since a legacy inter RAT technology is designed based on a request of a UE, interworking between a wireless LAN and a cellular network is not necessary, a specific network server manages wireless LAN information and inter RAT handover is enabled by the request of the UE. Moreover, although the UE is able to access multiple RATs at the same time, simultaneously accessing multiple RATs can be enabled in a manner of supporting flow mobility/IP-flow mapping in a network level only without controlling in a radio level. For this reason, the legacy technology requires no control connection between an AP and a cellular network and accessing multiple RATs has been performed based on a request of the UE. In order to enhance efficiency of overall network via a use of multi-RAT, it is necessary to provide a network-based tightly-coupled management rather than a technology based on a request of a UE. To this end, it is required to perform a more efficient and faster inter-RAT interworking in a manner of establishing a direct control connection between RATs different from each other and data of a UE should be transmitted by a main agent of the interworking using a best RAT. In particular, when a multi-RAT UE simultaneously transmits data in a manner of accessing RATs different from each other at the same time, since transmit power of the UE becomes the sum of transmit power used by each of legacy RATs, maximum transmit power transmitted by a random multi-RAT UE may exceed a reference value. In order to solve the aforementioned problem, a technology of the present invention proposes a method of controlling total transmit power of the multi-RAT UE.

The present invention proposes a method of reporting power headroom to control cellular transmit power of a UE capable of accessing WLAN and cellular at the same time.

Figure 8:
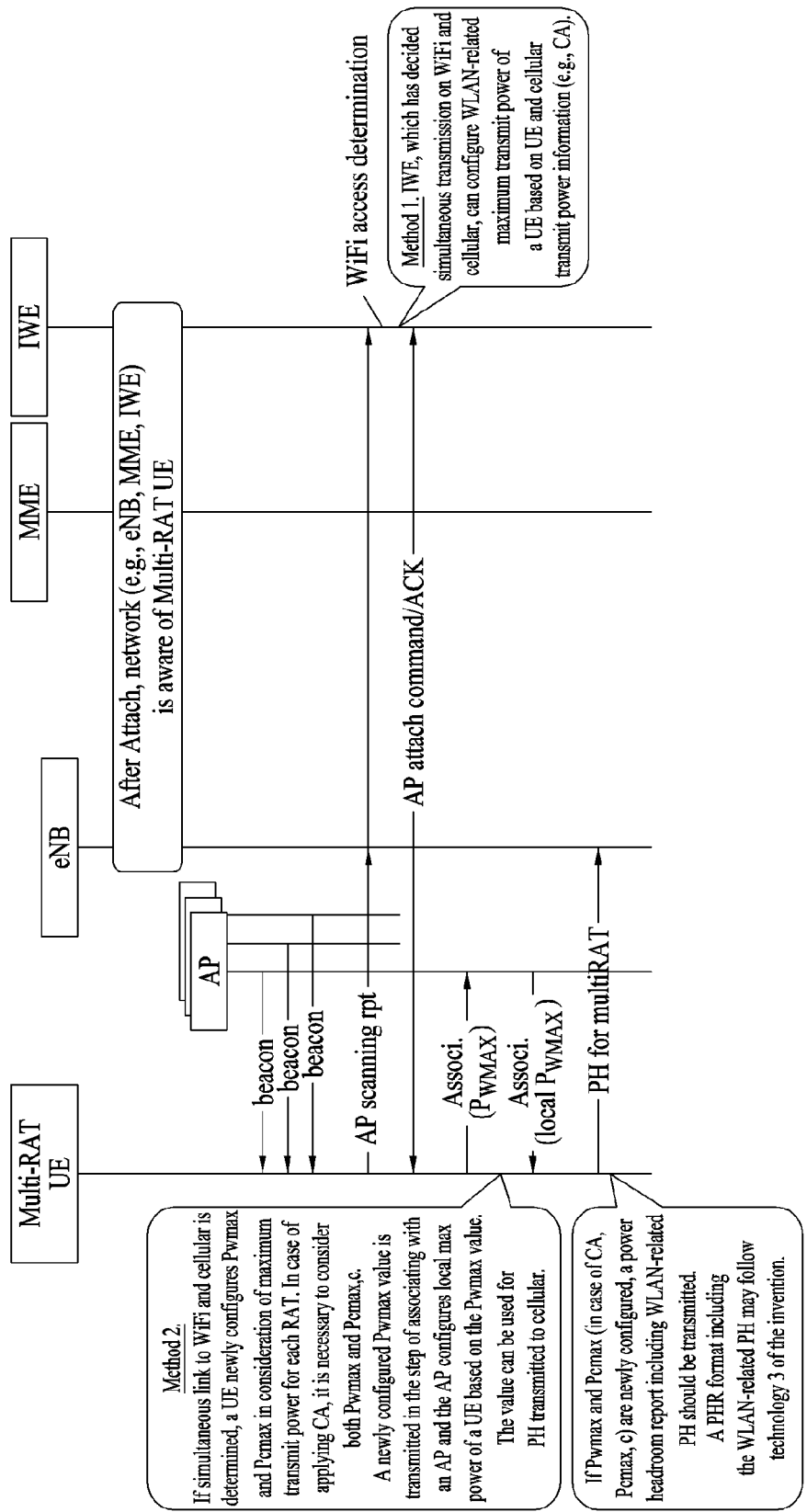
FIG. 8 is an exemplary diagram for explaining a method for a cellular to configure WLAN maximum transmit power of a UE.

FIG. 8 is an exemplary diagram for explaining a method for a cellular to configure WLAN maximum transmit power of a UE.

As shown in FIG. 8, after attachment, a network (e.g., eNB, MME, IWE) is able to know that a UE corresponds to a multi-RAT UE. After the UE performs scanning on surrounding APs, the UE can deliver AP scanning report to an eNB and an IWE. Subsequently, the IWE can determine the UE to access a specific AP on WiFi. Since maximum power capable of being used by the UE is determined in advance, maximum power capable of being used by each RAT may vary according to whether or not each of WLAN and cellular network is activated. If both the WLAN and the cellular are turned on (or activated), the maximum power of the UE should be equal to or less than "physical layer $P_{cmax}$ of cellular+$P_{wmax}$ of WLAN".

As a first method of configuring WLAN maximum tx. power of the UE by cellular, the IWE, which has decided simultaneous transmission on WiFi and cellular, can configure WLAN-related maximum transmit power of the UE based on the UE and cellular transmit power information. In this case, the cellular transmit power information may correspond to information in consideration of carrier aggregation (CA). The IWE can inform the UE of information on AP access such as $P_{wmax}$ of WLAN, an AP ID and the like via an AP attach command message.

As a second method of configuring WLAN maximum tx. power of the UE by cellular, the UE can autonomously configure WLAN maximum tx. power according to an activated RAT (method 2). If simultaneous link to WiFi and cellular is determined, the UE can newly configure $P_{wmax}$ and $P_{cmax}$ in consideration of maximum transmit power for each RAT. When CA is configured, it is necessary to consider both $P_{wmax}$ and $P_{cmax,c}$ (where c is index of serving cell). The UE transmits a newly configured $P_{wmax}$ value in the step of associating with an AP and the AP configures local max power of the UE based on the $P_{wmax}$ value. The AP transmits information on a value of the configured local maximum power to the UE in the association step. The UE determines a PH for a multi-RAT based on the received local maximum power value and may then transmit the PH to a network (eNB). As mentioned in the foregoing description, the second method of configuring WLAN maximum tx. power is to autonomously configure the WLAN maximum tx. power by the UE according to an activated RAT. The second method is more preferable than the first method for determining $P_{wmax}$ determined by the network.

In particular, the present invention proposes to dynamically configure maximum transmit power ($P_{WMAX}$) of a UE and cellular maximum transmit power ($P_{CMAX}$) in consideration of maximum transmit power of the UE according to whether or not WLAN is used. This may vary according to a carrier aggregation (CA) configuration of cellular.

As mentioned in the foregoing description, a UE transmits a power headroom report for a multi-RAT and the transmission of the power headroom report can be triggered by a specific triggering condition. Besides a legacy PHR transmission triggering condition, additional PHR triggering newly proposed by the present invention is described in the following. In the following, additional power headroom reporting trigger conditions for WiFi-cellular network interworking UE is proposed.

Additional Power Headroom Reporting Trigger Condition for WiFi-Cellular Interworking UE Added trigger condition 1: The technology of the present invention proposes to report power headroom when a power functionality of a UE is newly (re)configured according to a WLAN configuration (e.g., turn on/off) of the UE.

Added trigger condition 2: This is a case that a UE has an uplink resource allocated for a new transmission for TTI. WLAN_PHR can be configured. In particular, the WLAN_PHR can be configured by an AP attach command transmitted from a network or an association request/response message transceived between the UE and an AP. If the UE autonomously accesses the AP without the AP attach command, it is necessary to transmit a message indicating the attach to WLAN not only to an interworking entity but also to an eNB after association.

If a UE performs WLAN frame transmission in this TTI (transmission time interval), the UE can obtain a value of $P_{WMAX}$ field from a WLAN physical layer. And, the UE can obtain a value of WLAN power headroom for a WLAN frequency. Contents for obtaining the value of the WLAN power headroom for the WLAN frequency are further explained in the following description. If $P_{wmax}$ and $P_{cmax}$ (in case of CA, $P_{cmax,c}$) are newly configured, a power headroom report including WLAN-related PH should be transmitted. A PHR format including the WLAN-related PH is further explained in the following description.

Power Headroom Reporting for WiFi-Cellular Interworking UE

Method 1. Transmit power used in 802.11 system and maximum power are separately transmitted to an eNB. A PH MAC control element for IEEE 802.11 system is newly defined and transmitted. For example, as shown in Table 6 in the following, 11000 of an LCID can be defined to indicate a WLAN power headroom report.

TABLE 6

A value of LCID for UL-SCH

| Index | LCID values |
|---|---|
| 00000 | CCCH |
| 00001-01010 | Identity of the logical channel |
| 01011-10111 | Reserved |
| 11000 | WLAN Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Figure 9:
FIG. 9 is a diagram for an example of a WLAN PH MAC control element.

FIG. 9 is a diagram for an example of a WLAN PH MAC control element.

Referring to FIG. 9, a power headroom (PH) field indicates a power headroom level and can be represented by dB. This field can be used with reference to legacy power headroom levels for PHR or a power level appropriate for WLAN can be newly defined. A $P_{WMAX}$ field indicates wireless LAN $P_{WMAX}$ of a UE used for calculating the PH field. This field may correspond to $P_{WMAX}$ obtained from a physical layer of a UE or local $P_{WMAX}$ received again from an AP. The corresponding PH information can be used as a reference value when an eNB controls cellular PUSCH and/or PUCCH power of a UE. For example, remaining power can be controlled to be used by cellular side. If CA is applied to a corresponding UE, it is able to transmit the information together with an extended power headroom report. As an embodiment of contents for the WLAN PH MAC control element, it may be able to represent as FIG. 10 in the following.

Method 2: It is able to notify a transmit power value on WLAN when transmit power of a UE is measured.

Case 1. If CA is not configured, a UE is able to additionally transmit a PH of a new type in consideration of PUSCH and transmit power ($P_{WLAN}$) of 802.11. The PH of the new type can be represented as follows.

$$Ph_{type\_new}(i) = P_{max} - \{10 \log_{10}(M_{pusch}(i)) + P_{o\_pusch}(j) + \alpha(j) \cdot PL + \Delta_{tf}(i) + f(i) + P_{WLAN}\}$$

In this case, $P_{max} = P_{cmax} + P_{wmax}$ or $P_{max} = P_{cmax} + $ local $P_{wmax}$.

$P_{WLAN}$ corresponds to WLAN actual transmit power strength of same time (estimated transmit power). This field indicates actual power measured from an output of an antenna connector in this TTI.

A MAC control element for the PH may use a format defined in the aforementioned Method 1 as it is. It is able to use WLAN power headroom included in the aforementioned WLAN PH MAC control element. Or, it is able to define a MAC control element of a new format for a WLAN-cellular interworking UE. WLAN-cellular interworking power headroom MAC control element of a new format is further explained in the following description.

A PH value for a legacy PUSCH is calculated as shown in the following and is transmitted.

$$PH(i) = P_{cmax} - \{10 \log_{10}(M_{pusch}(i)) + P_{o\_pusch}(j) + \alpha(j) \cdot PL + \Delta_{tf}(i) + f(i)\}$$

The PH value can be defined to be transmitted by a different value according to 1) case of transmitting PUSCH and WLAN frame at the same time, 2) case of transmitting PUSCH only without transmitting WLAN frame, 3) case of transmitting WLAN frame only without transmitting PUSCH and 4) case of not transmitting PUSCH and WLAN frame. (Method similar to PH definition for CA)

Figure 10:
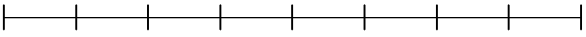
FIG. 10 is a diagram for an embodiment of a WLAN-cellular interworking power headroom MAC control element of a new format.

FIG. 10 is a diagram for an embodiment of a WLAN-cellular interworking power headroom MAC control element of a new format.

In order to indicate a WLAN-cellular interworking power headroom MAC control element of a new format, it is able to newly define an LCID value for UL-SCH in MAC layer. Table 7 in the following shows a new value indicating WLAN-cellular interworking power headroom. For example, LCID=11000 indicates the WLAN-cellular interworking power headroom.

TABLE 7

| Index | LCID values |
| --- | --- |
| 00000 | CCCH |
| 00001-01010 | Identity of the logical channel |
| 01011-10111 | Reserved |
| 11000 | WLAN-cellular interworking Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In FIG. 10, a W field indicates that PH for WLAN is transmitted after octet in which PH for cellular is transmitted, a PH field indicates a PH value for PUSCH of cellular, and a $P_{cmax}$ field indicates a cellular maximum transmit power value of a UE. A PH (new tyupe) field indicates a PH value for UL frame transmission of WLAN and a $P_{wmax}$ or local $P_{wmax}$ field indicates a WLAN maximum transmit power value of a UE. A V field indicates whether a PH value is based on actual transmission or a reference format. For a cellular type, V=0 indicates actual transmission on PUSCH and V=1 indicates that PUSCH reference format is used. For a WLAN type, V=0 indicates actual transmission on a WLAN UL frame and V=1 indicates that WLAN UL frame reference format is used. (Or, for a WLAN type, V=0 indicates that local $P_{wmax}$ is used and V=1 indicates that $P_{wmax}$ is used.)

Case 2. When CA is configured, PH of a new type in consideration of PUSCH/PUCCH and transmit power ($P_{WLAN}$) of 802.11 may be additionally transmitted.

In case of transmitting WLAN together, type 3 PH can be defined.

Method 1: A UE calculates PH for "$P_{pusch} + P_{pucch} + P_{WLAN}$" for a primary cell and the PH is transmitted by a type 3 PH. Since a type 2 PH for "$P_{pucch} + P_{pusch}$" and a type 1 PH for $P_{pusch}$ are previously transmitted, a cellular network can obtain a WLAN transmit power value based on the received type 1 PH and the type 2 PH.

Method 2: A UE calculates PH for WLAN and the PH is transmitted by a type 3 PH.

PH type 3 = $P_{wmax}$ (or local $P_{wmax}$) − WLAN actual tx. Power

It may be able to define an extended power headroom MAC control element. In particular, it may be able to define a new cellular-WLAN interworking extended PH and newly assign an LCID. The extended power headroom MAC control element format is shown in FIG. 10.

Figure 11:
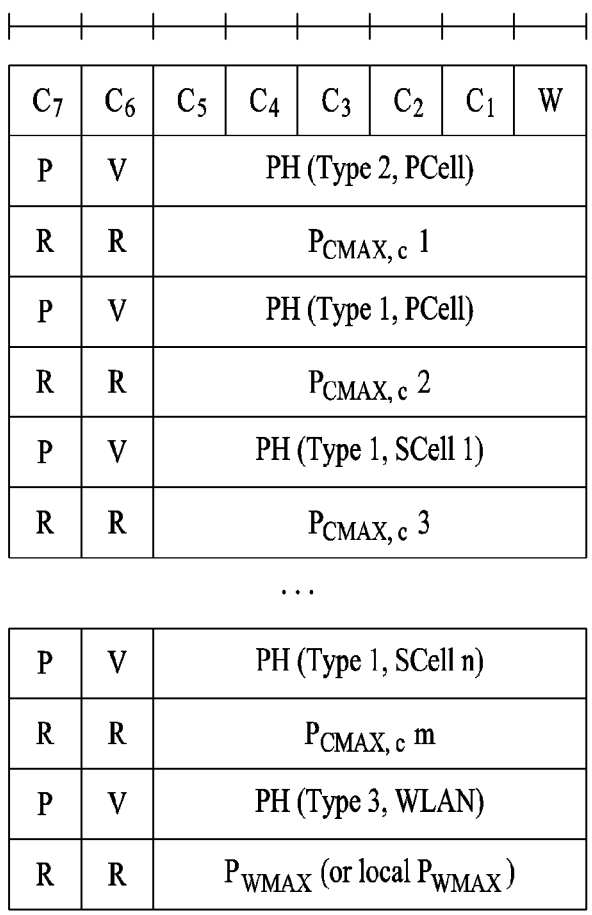
FIG. 11 is a diagram for an example of an extended power headroom MAC control element format.

FIG. 11 is a diagram for an example of an extended power headroom MAC control element format.

Referring to FIG. 11, a W field indicates that PH for WLAN is transmitted after a last octet in which PH for an activated cell is transmitted. In case of the method 1, a PH (type 3, WLAN) field indicates UL frame of WLAN and a PH value in which transmit power for PUSCH and PUCCH is included. In case of the method 2, the PH field indicates a PH value for UL frame transmit power for WLAN. A $P_{wmax}$ or local $P_{wmax}$ field indicates WLAN maximum transmit power value of a UE. A corresponding value can be transmitted with reference to a nominal UE transmit power level for $P_{cmax,c}$ or a level for WLAN can be newly defined.

The nominal UE transmit power level for the $P_{cmax,c}$ can be represented as Table 8 in the following.

TABLE 8

| $P_{CMAX,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

As mentioned in the foregoing description, in case of a UE simultaneously accessed a cellular network and a WiFi network, it is able to efficiently control transmit power of the UE capable of transmitting data to the cellular network and the WiFi network at the same time using a power headroom report on WLAN-related transmit power proposed by the present invention in a wideband wireless communication system.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A method for a UE of a first communication system to transmit a power headroom report in a network supporting interworking among a plurality of communication systems can be used in various wireless communication systems including 3GPP LTE, LTE-A and the like.

What is claimed is:

1. A method of transmitting a power headroom report by a user equipment of a first communication system in a network supporting interworking between a plurality of communication systems, the method comprising,
when a prescribed triggering condition occurs in a state that the user equipment accesses to the first communication system and a second communication system at the same time, transmitting a power headroom report containing a power headroom related to the second communication system,
wherein the power headroom report comprises information on a maximum transmit power of the second communication system, and
wherein the prescribed triggering condition comprises a case that a new maximum transmit power value for the first communication system of the user equipment and a new maximum transmit power value for the second communication system of the user equipment are configured for the user equipment.

2. The method of claim 1, wherein the prescribed triggering condition further comprises a case that a power functionality is reconfigured according to whether or not the user equipment is activated with the second communication system.

3. The method of claim 1, wherein the prescribed triggering condition further comprises a case that there exist a data to be transmitted via the second communication system during a corresponding transmission time interval (TTI).

4. The method of claim 1, wherein the power headroom report further comprises information on a configured maximum transmit power in the first communication system and a power headroom value based on actual transmit power strength to the second communication system during corresponding time.

5. The method of claim 4, wherein the maximum transmit power of the first communication system is configured to be smaller than a maximum transmit power, which is configured when the user equipment communicates with the first communication system only.

6. The method of claim 1, wherein a maximum transmit power of the second communication system corresponds to transmit power determined by the user equipment or a local maximum transmit power transmitted from a base station of the second communication system.

7. The method of claim 1, wherein the power headroom report is identified by a logical channel identifier containing a specific value.

8. A user equipment of a first communication system for transmitting a power headroom report in a network supporting interworking between a plurality of communication systems, the user equipment of the first communication system comprising:
a transmitter; and
a processor,
wherein the processor, when a prescribed triggering condition occurs in a state that the user equipment accesses to the first communication system and a second communication system at the same time, is configured to control the transmitter to transmit a power headroom report containing a power headroom related to the second communication system,
wherein the power headroom report comprises information on a maximum transmit power of the second communication system, and
wherein the prescribed triggering condition comprises a case that a new maximum transmit power value for the first communication system of the user equipment and a new maximum transmit power value for the second communication system of the user equipment are configured for the user equipment.

9. The user equipment of claim 8, wherein the prescribed triggering condition further comprises a case that a power functionality is reconfigured according to whether or not the user equipment is activated with the second communication system.

10. The user equipment of claim 8, wherein the prescribed triggering condition further comprises a case that there exist a data to be transmitted via the second communication system during a corresponding transmission time interval (TTI).

11. The user equipment of claim 8, wherein the power headroom report further comprises information on a configured maximum transmit power in the first communication system and a power headroom value based on actual transmit power strength to the second communication system during corresponding time.

12. The user equipment of claim 11, wherein the maximum transmit power of the first communication system is configured to be smaller than a maximum transmit power, which is configured when the user equipment communicates with the first communication system only.

13. The user equipment of claim 8, wherein a maximum transmit power of the second communication system corresponds to transmit power determined by the user equipment or a local maximum transmit power transmitted from a base station of the second communication system.

14. The user equipment of claim 8, wherein the power headroom report is identified by a logical channel identifier containing a specific value.

15. The user equipment of claim 8, wherein the first communication system corresponds to a cellular system and wherein the second communication system corresponds to a wireless LAN communication system.

\* \* \* \* \*